Oct. 9, 1934.  J. E. THORNTON  1,976,152
COLOR PHOTOGRAPHY AND IN METHOD THEREFOR
Filed June 16, 1930  2 Sheets-Sheet 1
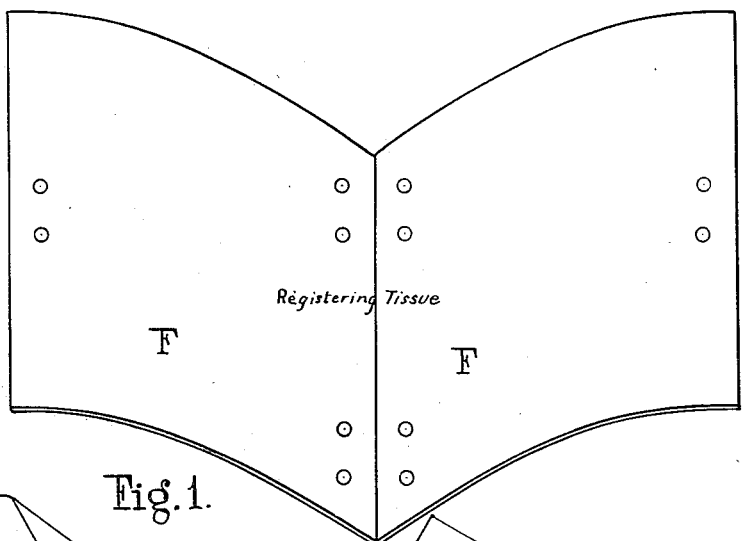
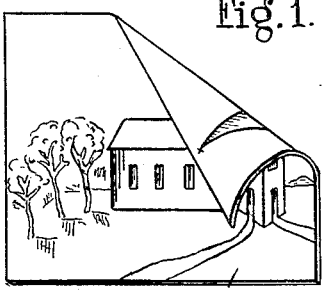
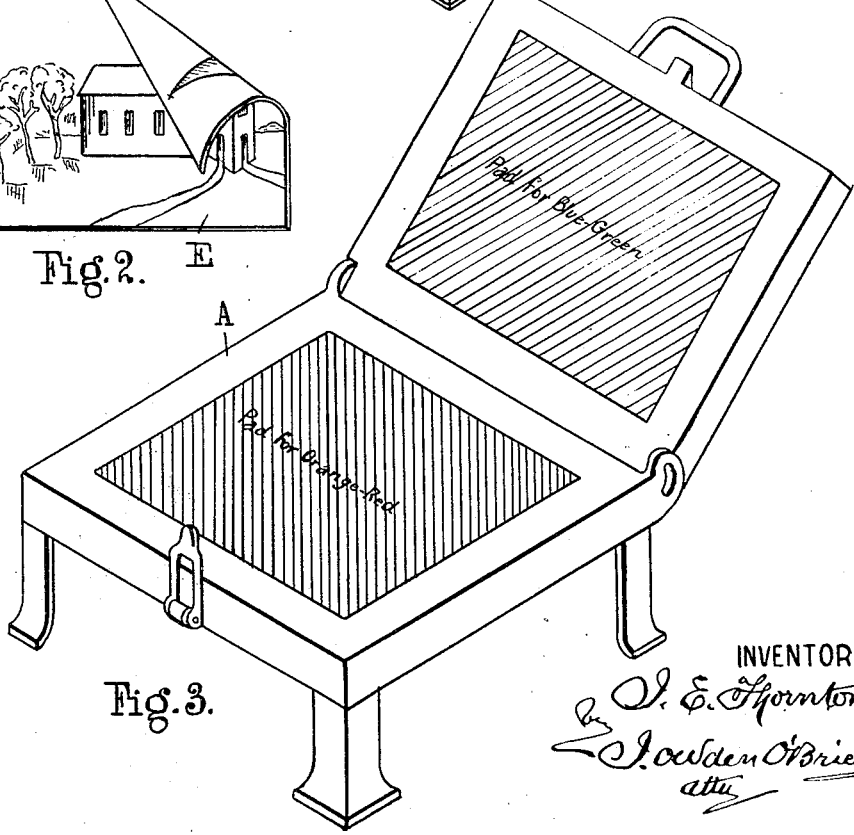
INVENTOR
J. E. Thornton Oct. 9, 1934.  J. E. THORNTON  1,976,152
COLOR PHOTOGRAPHY AND IN METHOD THEREFOR
Filed June 16, 1930  2 Sheets-Sheet 2
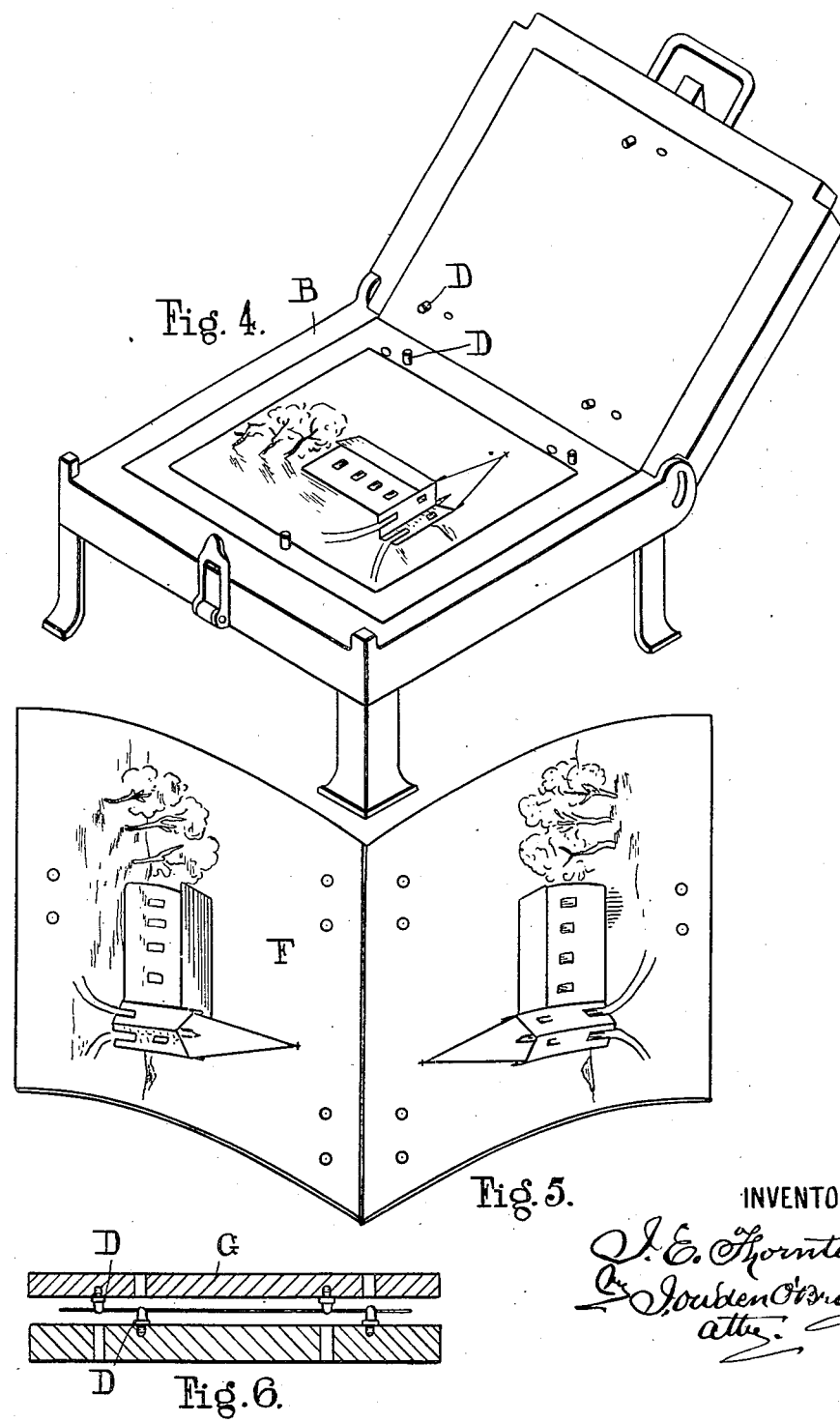
INVENTOR
J. E. Thornton Patented Oct. 9, 1934

1,976,152

UNITED STATES PATENT OFFICE 1,976,152

COLOR PHOTOGRAPHY AND IN METHOD THEREFOR

John Edward Thornton, St. Brelade, Jersey, Channel Islands, England

Application June 16, 1930, Serial No. 461,638
In Great Britain July 3, 1929

2 Claims. (Cl. 101—211)

This invention relates to improvements in processes of color photography for producing pictures in two colors by a combination of photographic and dye impression printing methods.

The invention is characterized in that on a film having on each side a light sensitive gelatine layer with color filter in front of one layer and a second color filter between the layers there are photographically produced and developed two component images after which the gelatine is hardened in direct ratio to the amount of silver remaining and the images fixed and colored with complementary colors and then copied in a press on to two positive tissues which are finally cemented together in accurate register with or without a reflective opaque surface or paper backing for viewing by reflected light.

The special duplex-negative film-material with which the process starts may be mounted and made up in a variety of forms for using in a variety of types of cameras, either as daylight-loading roll film cartridges, as daylight-loading film-packs, or as dark-room loading flat film-plates.

The object sought by this invention has been to produce a simple process by which amateur and other photographers could make pictures in colors by using a negative material that produces two-color-component images on one film and a positive-material and dye-impression printing process and apparatus for same that allows an unlimited number of prints to be made at a low cost.

This result is primarily attained by abandoning the theoretically perfect three-color standard and substituting the less perfect two-color standard. By this compromise tremendous advantages are secured in the matter of simplicity of operations and material, and the results are sufficiently pleasing to satisfy public requirements in many applications of photography, though it is not claimed that a two-piece process is suitable for every color-picture.

The two colors used in the preferred combination are orange-red and blue-green, which give in the finished picture a color range sufficient for a wide variety of subjects.

It has been found for example that the flesh tints of color portraits can be rendered with remarkable approximation to nature by a combination of orange-red and blue-green when either distributed or combined in proper proportions; and also that these two colors will give a pleasing rendering of the clothing of the person photographed and that also when used for many outdoor subjects and objects, for example landscapes, gardens, flowers, buildings or the like, the finished pictures present a result which many people would consider a good color photograph.

The methods, processes, materials and apparatus used in producing two-color pictures, according to the present invention, differ in many ways from the known methods.

The material points of difference are that only one piece of film-material is required for making the two negatives for conversion into one dye-plate for two-colors, and two pieces or leaves of positive material to receive the two colors which are eventually cemented together as one piece of material, and an unlimited number of prints can be made from one dye-plate. One of the most important points gained by these arrangements is that of accurate register of the two images when superimposed in the finished picture, which hitherto has been so very difficult to attain. This is primarily due to the construction of the negative film-material, and therefore also to the construction of the duplex dye-plate formed upon such film-material, and to the perforated duplex registering-tissue, and to the presses and registering pins used in printing, and to similar apparatus used in cementing and uniting the leaves of printed registering tissue.

The duplex film-material, dye-plate and positive-material combined are intended for use with any desired group of two colors but the two colors preferred for most subjects are the complementary pair of orange-red and blue-green.

Any variation from this group of complementary colors involves corresponding variations in the color filters used in combination with the two sensitized layers of the film, in their relative positions and in the nature of the emulsion layers used. Such variations are hereinafter described in detail.

The duplex sensitized film-material which is used in the first case for taking the two-color component negative-images simultaneously by one exposure in the camera, and which, after suitable development and treatment, eventually becomes the duplex dye-plate, is made according to the following process:—

Any suitable transparent support may be used if sufficiently thin to bring the two sensitive emulsions fairly near together. For a flexible roll-film or film-pack-material celluloid of about 2/1000 of an inch thick forms a good support; the same material can also be used by the professional portrait photographer though some will probably prefer a stiffer support, such as celluloid of about 5/1000 of an inch thick. The invention is also suitable for use with the semi-automatic portrait machines which produce while-you-wait photographs in strip form, and for that purpose a support of 2/1000 of an inch thick is useful.

The transparent support is first coated upon both sides with an adhesive substratum of known type as used for making emulsions adhere to a support.

One side of the substratumed support is coated with gelatino-silver-bromide emulsion which is color-sensitized to make it sensitive to light-rays of one complementary color of the pair, and the other side is coated with a gelatino-silver-bromide or chloride emulsion which is color sensitized to make it more particularly sensitive to light-rays of the other complementary color of the pair.

It is extremely important that the emulsions should be made without the addition of the usual hardening agent to the gelatine, as the latter must remain dye-absorbent.

The silver-content difference in speed and characteristics of the respective emulsions are suitably adjusted in known manner to enable equal printing density to be secured by the same exposure and development. For instance the slow one may be a silver chloride one and a fast one would necessarily be one of silver-bromide, with or without iodide.

These emulsions, after being coated and dried upon their central transparent support, are hereinafter described as sensitive layers.

The film is printed upon both sides with suitable lettering or marks to indicate which side is to be used for each color of dye in subsequent operations, and to indicate the front side.

Several workable variations of these sensitive layers are feasible within the scope of the invention, and it is not specially restricted to any particular grouping or color-sensitizing or speed of the sensitive layers; provided the color-sensitiveness and speed of one sensitized layer of the pair is complementary to the other, and will preserve the color balance and relative printing density of both images; and also provided that the pair of images formed upon the duplex film by exposure development and treatment are capable of producing a pair of complementary prints by suitable dyeing and transferring-methods.

To ensure that the two component images of the same picture made by the one exposure shall be sufficiently different from each other that one shall represent say the red-orange-yellow portion of the picture and the other represent the blue-green portion, the composite film is also provided with self-contained color filters through which the light passes and is filtered before it reaches and affects the sensitive layers. These filters may be of various known arrangements, constructions and methods of manufacture.

In one arrangement the front filter is formed of a separate layer of dye-colored colloid applied to the surface of the front sensitive layer; or it may be formed by dyeing the sensitive layer itself. The back filter may be formed by dyeing the sensitive back-layer itself, but is preferably formed by dyeing the back of the central transparent celluloid support. Or it may be formed by an intermediate layer placed between the transparent support and the sensitive back layer. The color and disposition of these filter layers depend upon the particular arrangement adopted for the two sensitive layers; that is to say it depends upon whether the orange-red sensitive layer is placed at the front or at the rear of the film, and similarly for any other preferred pair of colors.

The filter required for filtering out the intense blue or blue-violet light-rays to prevent their reaching the sensitive layers is of yellow or orange color, and instead of taking the form of a thin colored colloid layer applied to the front of the film, and forming part thereof, or of a deep dyeing of the front layer itself as described above, it may be a separate filter of colored glass, celluloid, or gelatine, placed before or behind the lens or immediately before the film.

Hereinafter the term "front layer" means the layer which will be turned towards the lens when placed in the camera.

In the preferred form of film-material the front layer is so sensitized that it is affected only by light rays of green and blue-green color, and the back layer is so sensitized that it is affected only by light rays of red and orange-red color.

In this arrangement the front layer is of comparatively slower speed, and is made as transparent as possible in order to pass as much light as possible through to the back layer, which is comparatively of very high speed.

When photographing in the camera upon such a film the light rays from the object first strike and affect the blue-green sensitive layer on the front of the film and then pass through the front layer and affect the orange-red sensitive back layer.

In an alternative form of the film-material the relative positions of the two emulsions are reversed, the front layer being of high speed and color-sensitized to be affected by the orange-red light-rays, and the back layer is color-sensitized to be affected by the blue-green light-rays and its speed needs to be higher than in the first arrangement because the blue-green rays have first to pass through the red emulsion.

The dyes used for color-sensitizing or for filter-coloring may be any of those well-known and now used for these purposes.

By suitable adjustment of the color-sensitizers of the blue-green emulsion when placed at the front a yellow filter on its face may be dispensed with entirely.

The front emulsion if for blue-green may be of such character and color that it becomes in effect a sufficiently good filter for the back emulsion as to dispense with the need for any intermediate filter layer.

Still another possible modification comprises one emulsion sensitive to violet, blue and blue-green and the other sensitive to yellow, orange and red.

Other combinations either of complementary or non-complementary colors, could be used where the process is required for decorative printing and designs other than portraits, landscapes, or other forms of photographs, and these may be any particular combination of colors desired. Monochrome photographs or designs can also be produced by using in combination two shades or tones of the same color.

The sensitized duplex film-material can be made up or mounted in a variety of ways such as daylight-loading roll-film cartridges, as daylight-loading film packs, or as dark-room-loading flat film plates.

Both sides of the duplex film-material are lettered to indicate which side must be dyed red and which green, so that the operator has only to note these indexes carefully in carrying out the dyeing operations and in correctly placing the film in the camera for exposure.

The process of producing the duplex dye-plate by means of the duplex sensitized film-material hereinbefore described, is as follows:—

The sensitized film-material is placed in any ordinary camera of glass-plate, film-pack, or roll-film description, with its correct side towards the lens, and one exposure is made through one lens, on to the one combination film, by which means an image for one color is formed upon the front sensitive layer and an image for the other color is formed upon the back sensitive layer.

The exposed film is next developed in a dark room under ordinary conditions usual in developing panchromatic sensitive films, and thus is produced a pair of complementary images of negative character in reduced silver upon opposite sides of the film, each of which records different portions of the colors of the subject photographed.

It is important that the developer used should be one which does not of itself have any tanning effect upon gelatine, and for that reason pyrogallic acid, pyrocatechine and others of like action are excluded. Ferrous-oxalate, amidol, glycin, or rodinal are suitable developers. If metol, hydroquinone, and similar developers are preferred they should be made up with a sufficient proportion of sodium sulphite to prevent any liability to tan the gelatine.

After development the duplex-negative is next converted into a dye-selective plate by treatment in an oxidizing bath of the type which will harden or insolubilize the gelatine of the black portions of each image in direct ratio to the amount of metallic silver remaining therein, but will leave the white portions as unhardened and still absorbent gelatine, the half tones being partly hardened and partly absorbent.

For this oxidizing bath there are various known formulæ of which the following may be taken as one suitable example:—

A. Potassium ferricyanide_____ 37.5 grams
   Potassium bromide_____ 36.25 grams
   Potassium dichromate_____ 37.5 grams
   Acetic acid_____ 10 cc.
   Water_____ 1000 cc.
B. Potassium alum 5 per cent solution.
For use mix equal volumes of A and B.

Another example, of simpler mixture, comprises:—

Chromic acid_____ 5 grams
Potassium bromide_____ 20 grams
Water_____ 1000 cc.

The duplex-negative requires to be fixed in the usual way, except that it is necessary the bath should be free from alum or any other agent that would have a tanning effect upon the surface of the gelatine.

A good formula is:—
A. Sodium hyposulphite_____ 250 grams
   Water_____ 1000 cc.
B. Sodium bisulphite_____ 400 grams
   Water_____ 1000 cc.
For use add one volume of B to one of A.

The operation of fixing, followed by the usual washing may take place immediately after development and before oxidizing, or it may follow the oxidizing process instead.

The duplex-negative is next dried and from thence onwards becomes the duplex dye-plate, by which name it is hereinafter described.

This duplex dye-plate is used as the means by which two dye-images of positive character are transferred to any suitable positive-material or support having an absorbent face.

The invention will be described with reference to the accompanying drawings:—

Fig. 1 is a perspective view showing a sheet of double width registering tissue F being folded together before being printed.

Fig. 2 is a perspective view of duplex dye plate E.

Fig. 3 is a perspective view of coloring press A.

Fig. 4 is a perspective view of printing or cementing press B both of which are of exactly the same construction.

Fig. 5 is a perspective view of two registering tissues F after printing.

Fig. 6 is a longitudinal section through cementing press G.

The special positive-material F used in carrying out the invention comprises an extremely thin layer or skin of extremely clear and transparent gelatine, glue, albumen, or other absorbent colloid, supported upon a backing sheet of paper, celluloid, or other material, and provided with perforations in duplicate for registration purposes. Each portion of positive-material for one picture comprises two sheets of leaves, or one double sheet which is folded to form two leaves. And each pair of leaves is provided with a complete series or set of perforations which exactly coincide in each leaf of the pair for use in accurately registering the two images one with the other in the printing process and again in the cementing and uniting process.

As a short descriptive name for this duplex-positive registering-tissue material it is hereinafter described as the "registering tissue".

The backing sheet in a registering tissue convenient for use by amateur and professional photographers comprises paper or similar opaque material having a hard glossy or semi-glossy surface on one side, and coated upon the said surface with a stripping medium such as rubber, wax, an oleate of a fatty acid, or like medium, and again coated over the stripping medium with the layer of gelatine or other absorbent colloid as aforesaid. The purpose of the stripping layer is to permit of the backing being separated from the colloid layer and discarded after the pair of dye-impressed colloid layers have been finally united. The print upon such tissue will be transparent.

In some cases a translucent print may be preferred, and in such case a matt-surfaced paper is used for the backing sheet to receive the stripping medium, and starch with gum or gelatine may be used as the colloid.

Or the backing sheet may comprise an extremely thin transparent layer of celluloid or like material, without any stripping medium, the celluloid and colloid being united as one so that the celluloid remains permanently a part of the registering tissue.

Various other modifications in the registering tissue and print produced thereon may be made. For example, instead of a soft and unhardened colloid being used one that is hardened may be used to prevent undue spreading of the dye. Or the colloid may contain a mordant that will assist transfer of the dye. Or the stripping medium may be coated on to only one of the two paper leaves, so that the uncoated one will form a permanent base for one image whilst the other image will adhere to it and leaves its stripping surface, allowing one paper to be thrown away and the other paper to form the permanent mount for both images.

The registering perforations formed in each pair of leaves are placed in their margins, clear of the parts that are to be printed, each leaf being larger than the print to be made thereon. The perforation-positions may be two in number, one at the top and another at the bottom of the leaf. Or they may be placed at opposite corners. Or more than two may be used, a convenient number being three, one in one margin and two in the opposite margin. Where very large prints have to be registered, or kinematograph film-strips, a larger number may be used.

But whatever number of positions are used for registering each pair of leaves the perforations are in duplicate, that is to say, two means two pairs and three means three pairs. The reason for this is that one set of registering pins of each pair is fixed in and projects from the bottom plate or bed of the press and the other set is fixed in and projects from the top plate or hinged platen of the press, and both sets of pins pass through the perforations of both leaves of registering tissue and enter holes of the opposite plate of the press when it is closed, as hereinafter described in the description of the press.

For making prints in small numbers which the amateur photographer may do, I prefer to use a simple piece of apparatus which I term the duplex coloring press, which comprises a double dye-pad A made in the form of two pads hinged together, book form, with a suitable fastener to retain them in the closed position. The pads may be formed of textile material having behind it an absorbent padding of wool, cotton, silk, sponge, gelatine or other suitable material, and these pads are carried by rigid metal or other plates which form the outer leaves of the book and are hinged together; the upper part being double with yielding springs between the two parts. Alternatively the springs may be dispensed with and pressure contact maintained by the weight alone of the upper part which is therefore made heavier.

The application of two different dye-colors to opposite sides of the duplex dye-plate can be effected in various ways, but I prefer to do it as follows:—

Orange-red dye is applied to one pad and blue-green dye to the other, by brush, compressible tubes, pipette bottle, or any other suitable means. Each pad is lettered for its own dye, in order to readily distinguish the colors.

The duplex dye-plate E is next inserted in the duplex coloring press between the two plates with their coloring pads; the top plate is then closed down and fastened. The dye-plate is left in the press until it has absorbed sufficient of each dye from the duplex pad; the correct period is ascertained by a first test, after which a standard time for dyeing is fixed, which may for instance be five minutes.

As the film is transparent the operator can always judge whether the depth of dyeing is sufficient by simply examining the duplex dye-plate by transmitted light.

As both sides of the duplex dye-plate itself and also the two pads are lettered to indicate which side must be dyed red and which green, the operator has only to note these indexes carefully in carrying out the dyeing operations.

The two dyes applied simultaneously upon opposite sides of the duplex dye-plate to the two images by the apparatus and in the manner already described, are absorbed by the white (or positive) parts of the image until saturated with color, but are rejected by the hardened parts, and the duplex dye-plate is then ready for the next operation, which consists in transferring the dyes from the duplex dye-plate to the registering tissues F by means of the duplex printing press B.

The duplex printing press B comprises two metal plates hinged together and a fastener to hold them in their closed position similar to the coloring press. One or both of the plates may be padded. Upon the lower plate are fixed a set of registering pins D which project from the surface of the plate and enter holes in the upper plate when closed down. A similar set also projects from the lower plate and enters holes in the upper plate.

The two-color print is made in the following manner. One leaf of registering tissue F is placed on the pins of the bed plate and the other leaf upon the pins of the hinged top plate or platen, the ready-made holes in each tissue leaf exactly fitting upon its own set of registration pins. The ready-colored duplex dye-plate is then laid between and the press immediately closed down, whereupon the top registration pins which are already in engagement with the perforations of the tissue upon the top plate or platen, enter and pass through the perforations of the other tissues upon the bottom plate or bed of the press and enter such bottom plate. Similarly the bottom registration pins pass through the perforations of the top leaf and enter the holes of the top plate or platen. When the press is closed the bottom pins are through both tissues and into the top plate and the top pins are through both tissues into the bottom plate, the top set of pins passing through one set of perforations of both tissues and the bottom set of pins passing through the other set (of the duplicate pairs) of perforations of both tissues.

Thus each leaf is immovably held upon its own plate and pins when the press is open, and both leaves are held by both sets of pins, and therefore are immovably locked in exact registration when the press is closed.

The dyed duplex-plate and pair of registering tissues are left clamped together in the press for the requisite length of time to ensure complete transfer of the two colors from the dye-plate on to and into the absorbent surfaces of the registering tissues by the simple process of imbibition. From 5 to 15 minutes will suffice, the duration being partly dependent upon the dyes and partly upon the absorbent character of the prepared surface. Quicker transfers can be got by using stronger dyes and harder specially mordanted surfaces.

When sufficiently printed the tissues are removed and the impressions thereon allowed to dry.

For uniting the pair of tissues a press G with registering pins is used of exactly the same construction as the printing press. For occasional use the same press may be used for both the printing and cementing operations, but for larger use separate presses are desirable.

When the two prints are dry their surfaces are coated with an exceedingly thin layer of adhesive, or the adhesive may if desired be applied whilst the surfaces are still wet.

If the colloid of the registering tissue has not been hardened it is desirable to give it a wash of weak alum or a weak acid solution after the colored images have been transferred thereto, or it may conveniently be incorporated with the cement. This acts as a mordant and also prevents spreading of the colors. Any other suitable mordant may be substituted.

The tissues are again registered upon the registration pins, and squeezed together in the press until completely united by their adhesive faces, then removed and allowed to dry, after which the paper backing can then be stripped away, leaving behind a gelatine film or foil formed of two layers cemented face to face, with the two colored images inside. When held up to transmitted light the finished print comprises a delicately colored transparency embedded in a sheet of gelatine foil.

The finished picture can then be mounted in any suitable manner by cementing on to a backing of paper, card, ivory, white or tinted celluloid, sheet metal or the like, for inspection by reflected light as a print; or it may be mounted between two glass or other transparent sheets for inspection as a transparency by transmitted light. This latter form is good for lantern transparencies, window transparencies for lamp shades, and other purposes. The thin foil positives may be used as transfers for decorating articles of great variety. Where celluloid backing has been used instead of paper it remains permanently attached and is not separated from the print.

By the registering tissue, coloring press, printing press and cementing press two component images of positive character, one in orange-red and the other in blue-green can be produced and combined into one complete positive of multicolors, intermediate or complementary colors being produced where the two primary colors overlap each other. The finished print contains no silver or other metallic salts, but consists of colored dyes alone absorbed into and suspended in a transparent colloid body which itself forms a complete sheet or foil or is further strengthened by the thin celluloid backing.

The invention provides a process which is a very great simplification over the many processes hitherto known and used for making color pictures by dye prints, especially three-color processes which required three negatives, three dye plates, three dye printings and much troublesome registration; whereas this process requires only one duplex-negative dye-plate and one positive dye-printing operation, the registration being simple and almost automatic.

Also the process of making the color negatives is as simple as ordinary photography, and necessitates the photographer learning or doing nothing new beyond the use of an extra bath for local hardening.

Making the print is also extremely simple, for the process of dye-printing is the cheapest of all known photographic printing processes.

What I claim as my invention and desire to protect by Letters Patent is:—

1. The method of printing from a plate which has a developed and hardened colloid image on each side of a support, which method comprises, coloring each of the images in different complementary colors, copying the images from the negative simultaneously on to two positive tissues and finally cementing the two positives together in register.

2. The method of printing from a plate which has a developed and hardened colloid image on each side of a support, which method comprises, coloring each of the images in different complementary colors, copying the images from the negative simultaneously on to a double width positive tissue and superimposing, registering and uniting the two images.

JOHN EDWARD THORNTON.